Dec. 6, 1966   H. E. TURNER   3,290,057
ONE WHEEL SINGLE RIDER VEHICLE OF THE AMUSEMENT TYPE
Filed Oct. 15, 1964   2 Sheets-Sheet 1

INVENTOR
HOYT E. TURNER
BY
ATTORNEY

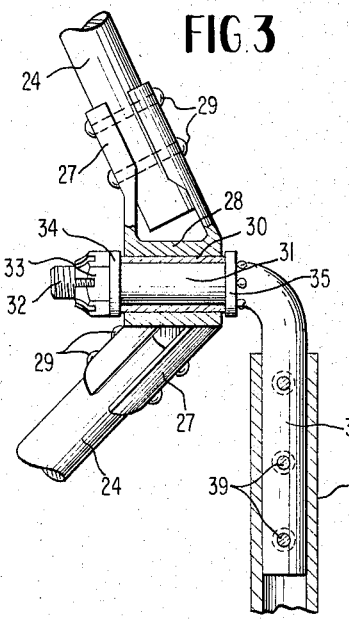
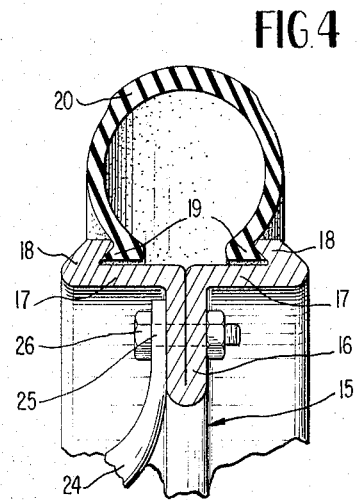
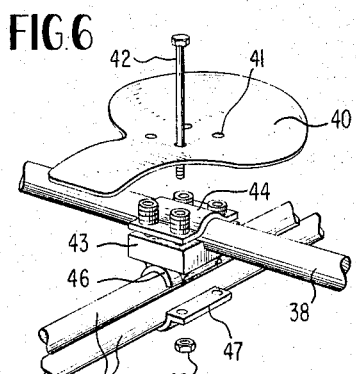
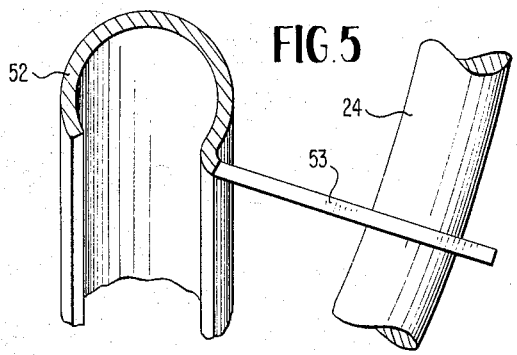
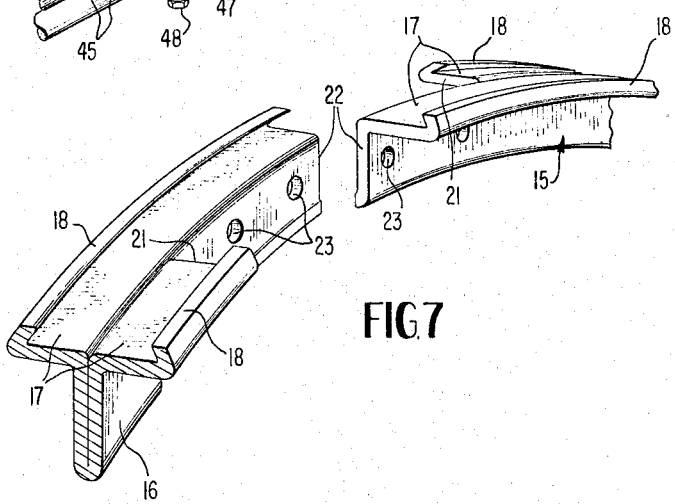
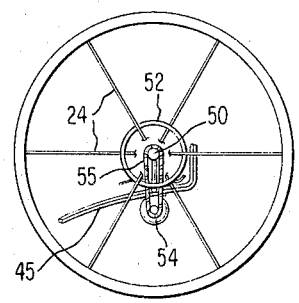
INVENTOR
HOYT E. TURNER United States Patent Office 3,290,057
Patented Dec. 6, 1966

3,290,057
ONE WHEEL SINGLE RIDER VEHICLE OF THE AMUSEMENT TYPE
Hoyt E. Turner, 802B Georgia St., Amarillo, Tex.
Filed Oct. 15, 1964, Ser. No. 403,992
3 Claims. (Cl. 280—206)

This invention relates to an amusement and exercising vehicle of the single rider one wheel type.

An object of the invention is to provide a single wheel vehicle for use by children or adults adapted to be manufactured quite economically from lightweight materials and offering an amusing, skill-requiring, and reasonably safe exercising ride when properly used.

Another object is to provide a vehicle of the mentioned class in which the single passenger or rider is seated between opposed spokes and inside of the wheel rim and between a pair of sturdy handle bars so as to be generally protected in the event that the single wheel vehicle should topple over before the rider can place his feet upon the ground to stabilize the vehicle.

A further object is to provide a single wheel vehicle having a number of constructional features which render the vehicle economical and very easy to assemble and disassemble.

Other objects and advantages of the invention will be apparent during the course of the following detailed description.

In the accompanying drawings forming a part of this application and in which like numerals are employed to designate like parts throughout the same, FIGURE 1 is a side elevation of a single wheel vehicle embodying the invention;

FIGURE 3 is an enlarged fragmentary central vertical section through one hub unit, partly in elevation;

FIGURE 4 is an enlarged fragmentary radial section taken on line 4—4 of FIGURE 1;

FIGURE 5 is a similar section taken on line 5—5 of FIGURE 1;

FIGURE 6 is an exploded perspective view of a seat and associated elements;

FIGURE 7 is a fragmentary exploded perspective view of a wheel rim, partly in section; and FIGURE 8 is a greatly reduced side elevation, partly diagrammatic, showing a modification where the vehicle contains a power unit for propulsion.

Figure 2:
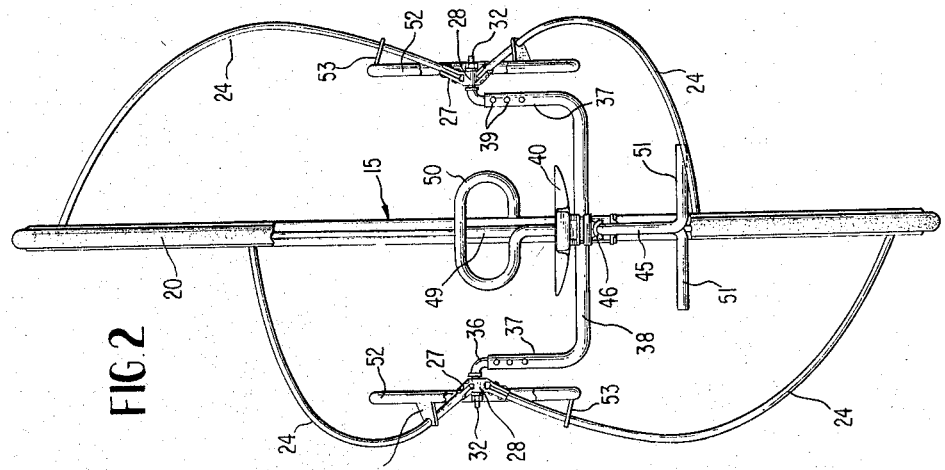
FIGURE 2 is an edge elevation of the vehicle.

In the drawings, wherein for the purpose of illustration are shown preferred embodiments of the invention, attention is directed first to FIGURES 1-7 which illustrate a preferred form of the invention wherein the vehicle is started and propelled by the occupant with the aid of gravity. In these figures, the numeral 15 designates a large wheel rim or body portion, preferably formed of sheet aluminum or the like, and adapted to be manufactured in one piece or several sections, as found desirable. The rim 15 includes an annular radial web 16 of double thickness and rigidity, FIGURE 4, and a pair of oppositely directed circumferential annular flanges 17 formed integral with the web 16. The opposite sides of the rim carry annular clinching beads or flanges 18 for interlocking retaining relationship with beads 19 of a suitable pneumatic tire 20. If preferred, a solid tire may be employed with any desirable rim configuration.

FIGURE 7 illustrates a typical rim joint for a single piece rim or one formed of multiple sections. In this figure, opposite sides of the rim portions to be connected are cut away or notched through their flanges 17 and 18 as shown particularly at 21. Single thickness sections of the radial web 16 are also removed adjacent the notches 21 and the remaining single thickness walls 22 are provided with openings 23 therethrough for the reception of bolts, not shown in FIGURE 7. If preferred, the extremities of the single piece rim or multiple section rim may be joined in other ways as by welding, for example.

Figure 1:
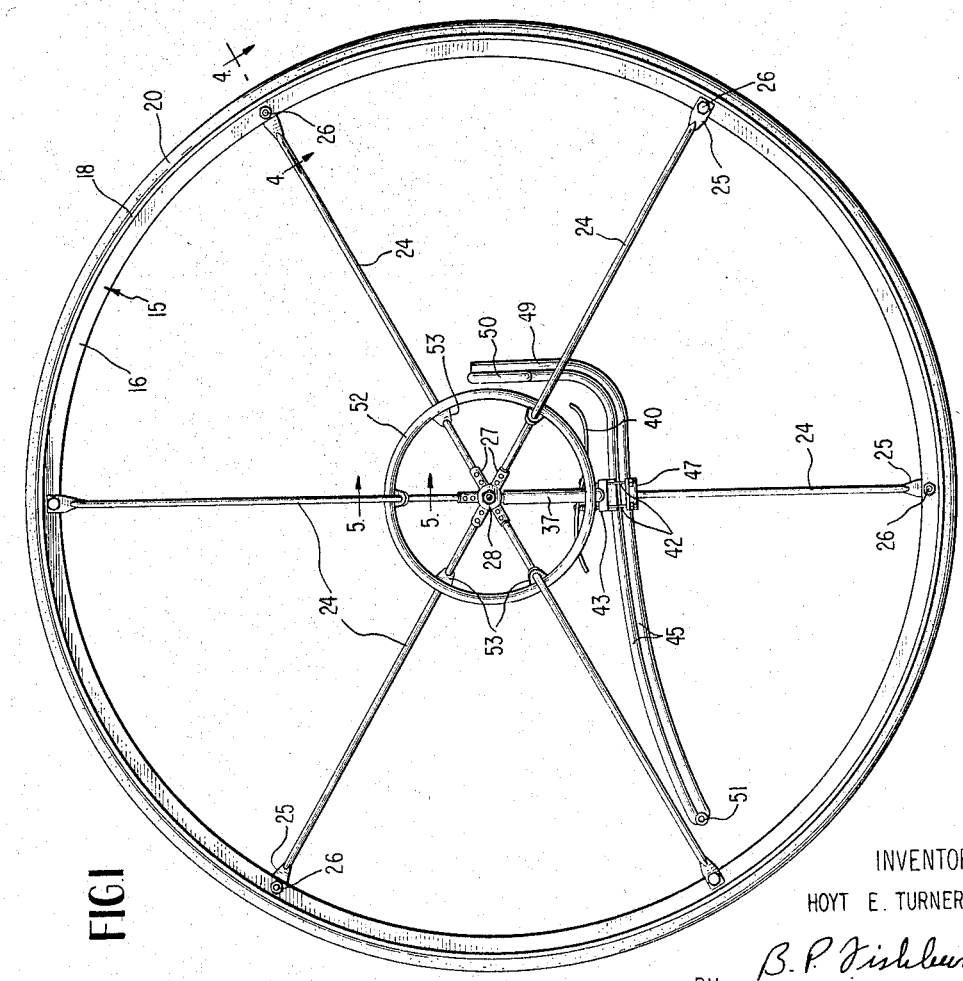

The vehicle further comprises approximately semi-circular outwardly bowed spokes 24 on opposite sides of the rim 15, there being preferably three circumferentially equidistantly spaced spokes on each side of the rim with the spokes on one side staggered 60 degrees circumferentially from the spokes on the opposite side, as plainly shown in FIGURE 1.

The outer flattened extremities 25 of the spokes 24 are bolted at 26 to the appropriate opposite sides of the double thickness web 16. The inner ends of the spokes are received within split sockets 27 formed integral with hub units 28 and riveted to the sockets as indicated at 29 in FIGURE 3.

As may be observed in FIGURE 2, the wheel or vehicle has a pair of hubs spaced apart axially and equidistantly on opposite sides of the rim 15 and this is a unique feature of the construction. One hub unit is depicted in FIGURE 3 and the two hub units are identical. With reference to FIGURE 3, each hub unit 28 has a suitable bearing or bushing 30 therein, receiving rotatably a short axial journal 31 having a screw-threaded extension 32 carrying a suitable nut 33 and washer 34. The journal 31 has a stop shoulder 35 on its interior end and includes a depending normally vertical extension or arm 36 integral therewith, received telescopically within one upright side 37 of an underslung U-shaped seat suspension bar 38 or cradle upon which the single rider is suspended from the two hubs 28. Each arm 36 is securely and adjustably connected with the tubular element 37 by bolt means 39, as shown.

A bicycle-type seat 40 formed of sheet metal or the like has central openings 41 for suitable bolts 42 employed to secure the seat rigidly to a clamp structure including a clamp block 43 for the underside of bar 38 and an upper clamping plate 44 immediately above the bar 38, FIGURE 6.

The seat structure of the vehicle further embodies a generally horizontal, although gently curved, pair of superposed bars 45 immediately below the block 43 and rigidly secured thereto by a pair of coacting clamp plates 46 and 47, the former secured directly to the block 43 and the latter being separately formed and receiving the aforementioned bolts 42 which pass downwardly through all of the elements 44, 43 and 47 by virtue of aligned openings therein. Nuts 48 are placed upon the lower ends of bolts 42 to secure the assembly. The bars 45 may be adjusted forwardly or backwardly within the elements 46 and 47, before tightening of the bolts 42. Only one bolt 42 is illustrated in FIGURE 6 for simplicity, it being understood that four bolts are required.

The bars 45 are directed upwardly vertically at their rear ends to form a seat back rest 49, one of the bars being formed into a laterally elongated back rest loop 50, as shown in the drawings. The structure is simplified and extremely sturdy. The forward ends of bars 45 carry oppositely extending lateral portions 51 constituting foot rests or supports. When the vehicle is in motion and after balancing is obtained, the rider may have his or her feet elevated from the ground and placed upon the foot rests 51 while being seated upon the seat 40 and utilizing the back rest 49–50. The full weight of the rider or occupant will then be freely suspended in a pendulum-like manner from the spaced pair of hubs 28 of the wheel.

To aid in propelling and balancing the vehicle, a pair of circular relatively large handle bars 52 are provided on opposite sides thereof substantially adjacent the hub units 28, in surrounding concentric relation thereto. As shown in FIGURE 2, the handle bars 52 lie substantially inwardly of the bowed spokes so as to be readily gripped by the hands of the rider. As shown in FIGURES 2 and 5, each circular handle bar 52 may be formed of sheet metal and provided with circumferentially spaced integral lugs 53, each having an opening to receive an adjacent spoke 24. In this simplified manner, the two circular handle bars 52 are securely anchored fixedly to the three spokes on opposite sides of the vehicle. The lugs 53 of each handle bar 52 are therefore three in number and equidistantly spaced circumferentially, as shown in FIGURE 1.

In use, the rider seated upon the seat 40 may place has feet upon the ground and may take a few steps to attain sufficient speed and momentum for balance. The handle bars 52 are utilized at the same time. The rider's footsteps are easily synchronized during the initial movement of the vehicle between the widely spaced staggered spokes on opposite sides of the vehicle and there is no likelihood of tripping or having the legs become entangled with the spokes. This also adds to the requirement for a certain amount of skill and makes the use of the vehicle more enjoyable and challenging. Once sufficient momentum and balance are obtained, the feet are elevated and the rider may use the handle bars 52 to propel the vehicle. In this connection, when force is applied to the circular handle bars, the rider's upright position is maintained by the natural tendency to lean forwardly when applying a forward force through the arms. Gravity maintains the rider substantially upright on the pendulum-type seat structure through the bar 38 at all times. It is thought that the construction and operation of the vehicle and the advantages thereof as an amusement and exercising device are readily apparent without any further description herein.

FIGURE 8 is a diagrammatic showing of the identical one wheel vehicle depicted in FIGURES 1 through 7 with the addition of a power propulsion unit 54 suitably secured to the seat structure and drivingly connected through a chain 55 or the like with a driving axle 56, pulley or part of the handle bar structure. FIGURE 8 simply illustrates that a powdered vehicle of the one wheel type is within the scope of the invention and the invention, while unpowered in the preferred embodiment thereof, is not necessarily limited in this respect.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A one wheel single rider vehicle comprising a large ground-engaging wheel, a pair of hub units coaxial with the wheel and arranged equidistantly from opposite sides of the wheel in spaced relation, outwardly bowed spokes interconnecting the hub units and wheel substantially rigidly, said spokes staggered circumferentially on opposite sides of the wheel and forming a protective cage around the rider of the vehicle, a substantially U-shaped transverse seat suspension bar suspended freely from the hub units and having axially aligned journals rotatable in the hub units, a single rider seat on said suspension bar, said seat comprising an adjustable clamp structure on said suspension bar, a bicycle type seat on the clamp structure, and additional bar means on the clamp structure forming a back rest rearwardly of the suspension bar and a foot rest forwardly thereof so that the feet of the rider may be entirely elevated when the vehicle is in motion, and a pair of relatively large annular substantially axially aligned handle bars secured to the spokes on opposite sides of the vehicle adjacent said seat.

2. The invention as defined by claim 1, and wherein each annular handle bar carries a plurality of circumferentially spaced apertured lugs adapted to receive the spokes at the adjacent side of the vehicle, said lugs being the sole means of attaching the handle bar to the spokes.

3. The invention as defined by claim 1, and wherein said wheel includes a peripheral tire-supporting rim and a radially inwardly projecting annular web, said spokes having flattened outer end portions engageable with opposite faces of said web in the staggered arrangement of the spokes, and bolt means connecting said flattened portions and web.

References Cited by the Examiner

UNITED STATES PATENTS

| 299,617 | 6/1884 | Burglinghausen | 280—206 |
| 396,349 | 1/1889 | Behr | 280—206 |
| 511,139 | 12/1893 | Harper | 280—206 |
| 792,403 | 6/1905 | Crosse | 280—206 |
| 2,855,979 | 10/1958 | Hubbard | 280—249 |

KENNETH H. BETTS, *Primary Examiner.*